April 20, 1965   J. A. HISLOP   3,178,825
COUNTERBALANCED DRAFTING MACHINE
Filed Sept. 25, 1961   3 Sheets-Sheet 3

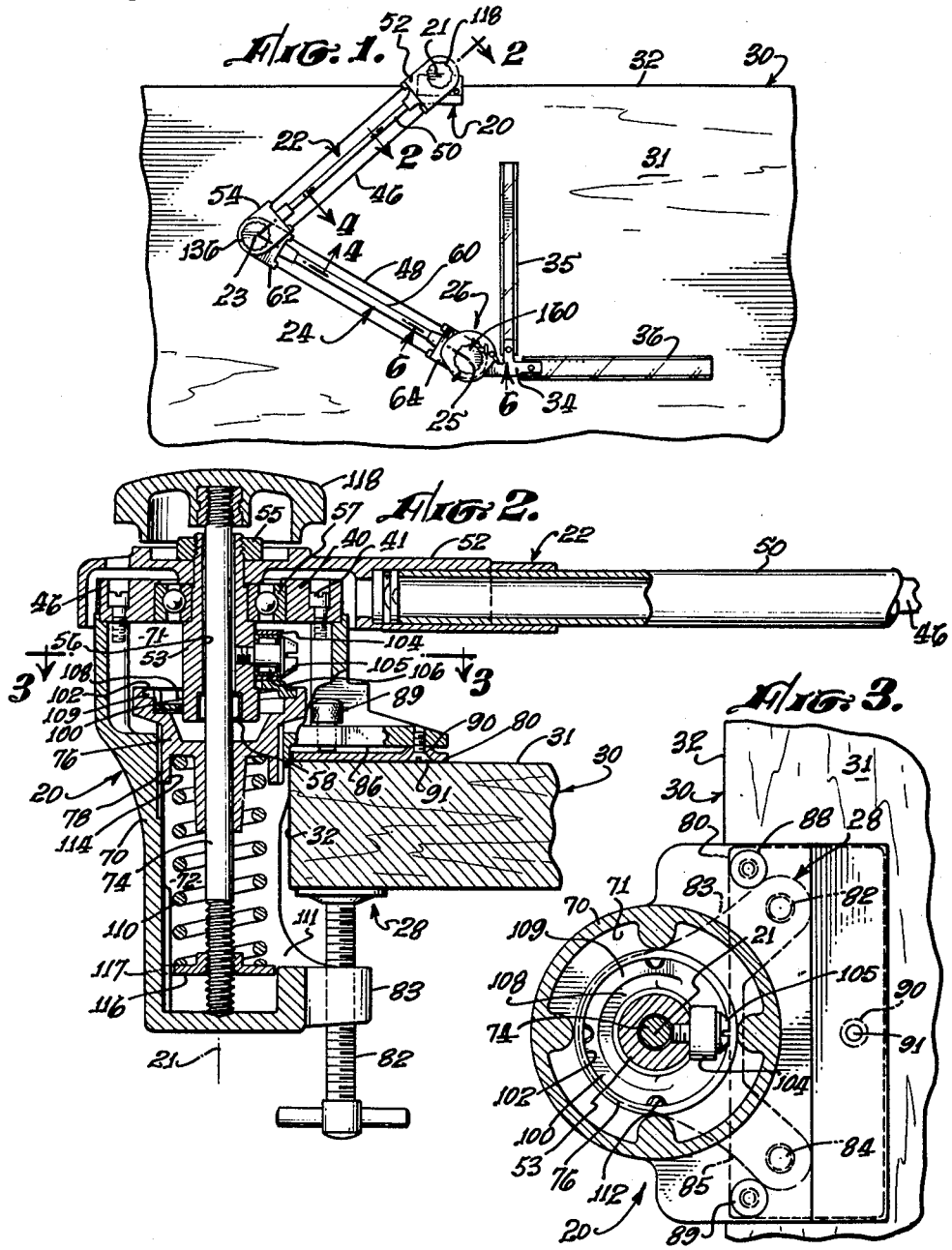

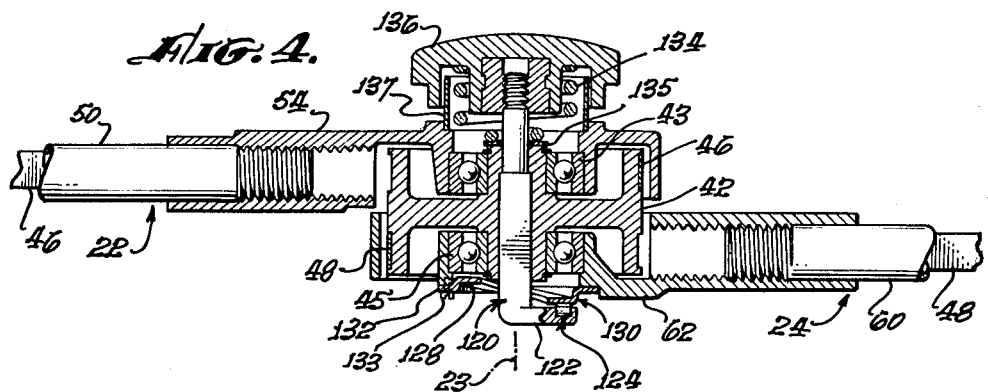

JOHN A. HISLOP,
INVENTOR.

BY
Barbalew + Lewis

United States Patent Office

3,178,825
Patented Apr. 20, 1965

3,178,825
COUNTERBALANCED DRAFTING MACHINE
John A. Hislop, Costa Mesa, Calif., assignor to Vard
Newport, a corporation of California
Filed Sept. 25, 1961, Ser. No. 140,390
11 Claims. (Cl. 33—79)

This invention has to do generally with drafting machines of the type in which a scale or other drafting tool is movable in translation over the working surface of a drafting table or the like.

The invention is concerned more particularly with such instruments in which the drafting tool is mounted by means of one or more pivoted arms, and is caused to move parallel to itself by rotational defining means carried by those arms. An upper arm is typically pivoted on an anchor assembly fixed to the drafting table, and a lower arm is pivoted on the free end of the upper arm.

The invention provides improved structure for such drafting machines, which structure makes possible improved accuracy and convenience of operation together with great economy of production.

One aspect of the invention provides improved counterbalancing of the arms of the drafting machine when the drawing surface is inclined. The counterbalancing mechanism is particularly compact and economical, while producing a balancing torque that varies accurately in accordance with the theoretically required torque to provide perfect balancing action.

A particularly useful feature of this aspect of the invention is the provision of separate counterbalancing mechanisms for each of the arms of the machine, which act independently and are separately adjustable. The counterbalancing mechanism for the lower arm has the further advantage of incorporating a frictional restraint of suitable value which is adjusted automatically with the counterbalancing force. Those balancing mechanisms utilize face cams of novel construction in combination with coil springs mounted coaxially of the respective pivot axes.

A further aspect of the invention provides convenient adjustment of the orientation of the anchor assembly on the board, to make the pivot axes accurately perpendicular to the working surface.

A further aspect of the invention provides especially economical and effective head structure for machines of the described type, by which the drafting tool may be mounted for conveniently adjustable rotation and may be locked at any desired angle.

The head structure of the invention typically includes a fully enclosed scale for indicating the angle of the drafting tool. An optical magnifier of novel construction is provided for reading that angle. Moreover, the scale is mounted in raised position for easy visibility and for minimum obstruction of the working surface.

Both the scale and the indexing mechanism are closely associated with the angle defining means, typically a pulley and band structure.

The invention further affords particularly convenient and effective base line adjustment, whereby the drafting tool and scale zero may be aligned with a particular drawing. That structure provides an unusually large mechanical advantage in the locking mechanisms, giving especially smooth and positive braking action.

A full understanding of the invention, and of its further objects and advantages, will be had from the following description of an illustrative manner in which it may be carried out. The particulars of that description, and of the accompanying drawings which form a part of it, are intended only as illustration of the invention, and not as a limitation upon its scope, which is defined in the appended claims.

In the drawings:

FIG. 1 is a plan representing an illustrative drafting machine embodying the invention;

FIG. 2 is an axial section on line 2—2 of FIG. 1 at enlarged scale with parts in elevation;

FIG. 3 is a section on line 3—3 of FIG. 2;

FIG. 4 is a section on line 4—4 of FIG. 1 at the scale of FIG. 2;

FIG. 5 is a fragmentary section illustrating a detail of FIG. 4;

FIG. 5A is an exploded perspective illustrating a detail of FIG. 4;

FIG. 10 is a fragmentary section on line 10—10 of FIG. 7; and

FIG. 11 is a fragmentary section on line 11—11 of FIG. 7.

Figure 7:
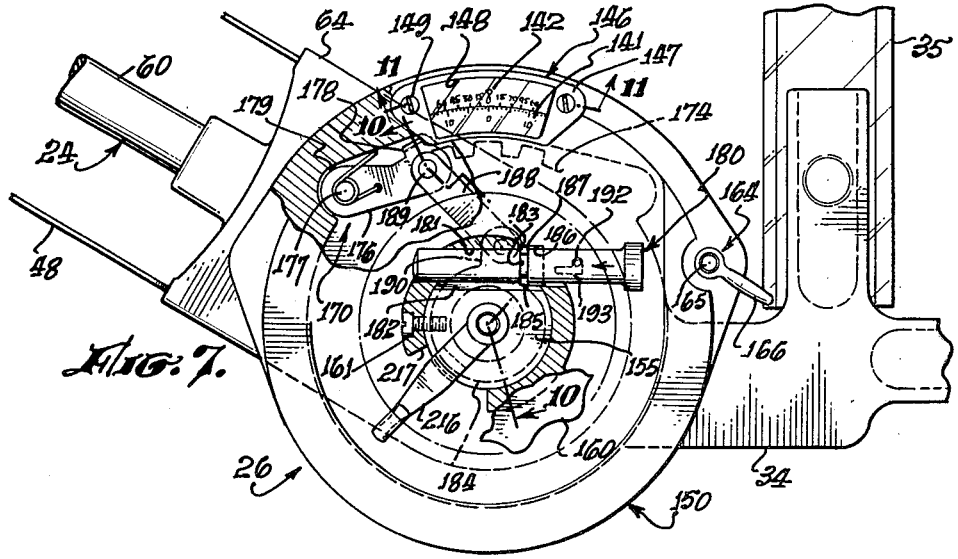
FIG. 7 is a fragmentary plan partially cut away, corresponding to FIG. 6.
Figure 6:
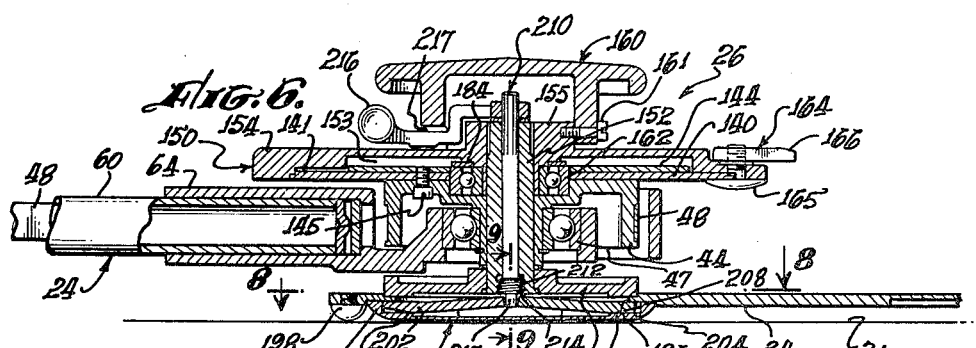
FIG. 6 is a section on line 6—6 of FIG. 1 at the scale of FIG. 2.
Figure 8:
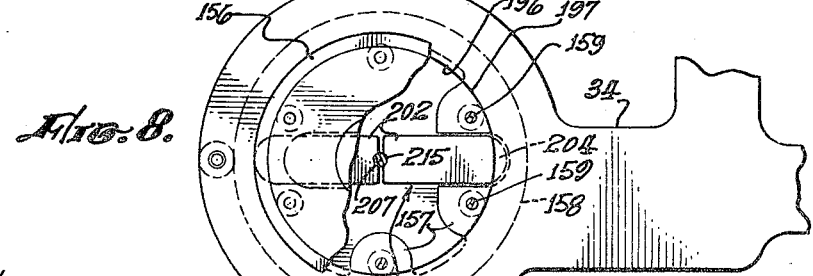
FIG. 8 is a section on line 8—8 of FIG. 6.

The illustrative embodiment of the invention shown in the drawings comprises the anchor assembly 20; the upper arm 22, pivotally mounted on anchor assembly 20 on the anchor axis 21; the lower arm 24, pivotally mounted on the free end of upper arm 22 on the elbow axis 23; and the head assembly 26, mounted on the free end of lower arm 24 on the head axis 25. Axes 21, 23 and 25 are mutually parallel. Anchor assembly 20 includes clamp structure 28, to be more fully described, by which it may be releasably fixed to a drafting board or table 30 with anchor axis 21 perpendicular to the working surface 31.

Head assembly 26 includes the scale carrier 34, adapted to carry a drafting tool of any desired type, shown illustratively as the drafting scales 35 and 36. Scale carrier 34 is rotatably mounted, by structure to be more fully described, on lower arm 24 for rotation about head axis 25. The rotational position of scale carrier 34 is normally positively fixed with respect to anchor assembly 20 by a defining mechanism that leaves the arms free to swing about their pivot axes. In the present embodiment that defining mechanism is of pulley and band type and includes the anchor pulley 40, fixedly mounted in the anchor assembly on axis 21; the elbow pulley 42, journaled on elbow axis 23 with respect to both the upper and lower arms by the respective ball bearings 43 and 45 and constituting the pivotal connection between the arms; and head pulley 44, rotatably mounted on ball bearing 47 on head axis 24 and releasably coupled to scale carrier 34. The upper flexible band 46 rotationally couples elbow pulley 42 to fixed anchor pulley 40; and the lower flexible band 48 couples head pulley 44 to elbow pulley 42. The elbow pulley and head pulley thus maintain a fixed orientation defined by the orientation of anchor pulley 40, and constitute reference elements within the elbow assembly and head assembly, respectively, for establishing fixed directions. Since the orientation of the scales is defined with respect to head pulley 44, swinging of arms 22 and 24 thus permits the scales to be moved freely over work surface 31 in translation only and without rotation. The straight runs of the bands are typically enclosed in plastic covers, omitted from the drawings for clarity.

Upper arm 22 comprises the arm beam 50 of tubular form, the anchor bracket 52 and the upper bracket 54. One end of beam 50 is freely received in a bore in anchor bracket 52 (FIG. 2), with a pivot washer and thrust pad at its end to facilitate rotation. The other end of the beam is threaded in a bore in upper bracket 54 (FIG. 4). The brackets are thus held at a positively defined mutual spacing, which is adjustable by rotation of beam 50 to tension band 46. The lower arm is typically of similar construction, comprising the lower beam 60, the lower bracket 62 and the head bracket 64.

Anchor assembly 20 comprises the anchor housing 70, which defines the generally cylindrical upper chamber 71 and lower chamber 72 on anchor axis 21. Anchor pulley 40 is fixedly mounted at the top of the upper chamber by the screws 41, forming an upper wall of the housing. The ball bearing 57 is centrally mounted in pulley 40. It forms the main pivot bearing for upper arm 22, and defines the axial position of the latter. The inner race of bearing 57 is mounted on anchor bracket 52 by means of the mast 53, which is fixed thereon by the nut 55. The mast is axially bored to freely receive the shaft 74. The lower end of the mast carries the needle bearing 58, the inner race of which engages and is centered by that shaft. The needle bearing thus forms a second pivot bearing for arm 22.

Shaft 74 is effectively journaled on anchor axis 21 by the plain bearing formed by the coaxial bore in the member 76. That member also carries the face cam 100, more fully described below. Cam carrier 76 is guided for free axial translational movement by ways formed at 78 at circumferentially spaced points of the wall of housing chamber 72. Those ways define a fixed rotational position of the carrier about axis 21. They fit closely enough to define the axis of shaft 74, maintaining it and needle bearing 58 effectively coaxial with axis 21. The accuracy required for that definition is not excessive, particularly since bearing 58 is closely spaced axially from the defined portion of shaft 74.

Anchor assembly 20 is releasably mounted on drafting board 30 by means of the two manual clamp screws 82 and 84, threaded in obliquely extending arms 83 and 85 which are typically integral with housing 70 (FIGS. 2 and 3). Accurate adjustment of the anchor assembly, particularly to make axes 21, 23 and 25 perpendicular to working surface 31, is facilitated by the clamp plate 80. That plate overlies the working surface of the board opposite the clamp screws, and is mounted in spaced and angularly adjustable relation to the flat clamp face 86 of the anchor housing. That spacing is fixedly defined at one point by the small circular boss 90. The spacing is positively but adjustably defined at two other points by the adjusting screws 88 and 89, which are threaded in the housing normal to face 86. The plate is defined in its plane, but left free for rotational adjustment, by the retaining screw 91, coaxial of boss 90. Adjustment of thumb screws 88 and 89 may be facilitated by loosening one or both of the clamp screws 82 and 84.

The counterbalancing mechanism for upper arm 22, in the present illustrative embodiment, comprises the generally annular face cam 100, fixedly mounted, as by a press fit, in a recess 102 in cam carrier 76, already described; the cam follower 104, mounted on mast 53 by means of the screw stud 105; and the coaxial coil spring 110 and its mounting means, which produce axial force between the cam and cam follower and provide convenient adjustment of the magnitude of that force.

Cam follower 104 typically comprises a roller sleeve journaled on stud 105 by the needle bearing 106. Stud 105 is threaded in mast 53 at a definite azimuth angle with respect to arm 22, typically extending from axis 21 in the same direction as the arm beam 50. The generally axial thrust exerted by the cam upon the cam follower then not only counterbalances arm beam 50 rotationally but also tends to swing the arm in an axial plane away from the drawing board, thereby supporting a portion of the arm weight and reducing the radial loads on journal bearings 57 and 58 when the drawing board is set at an oblique inclination. That relation is shown in FIGS. 2 and 3, which, however, represent upper arm 22 perpendicular to upper edge 32 of the drafting board, rather than in the generalized position of FIG. 1.

Cam 100 is so formed that its axially facing cam face 108 is generally annular in form, but varies in axial position as a sinusoidal function of angle. In the present illustrative embodiment the cam member is formed from sheet material, as by stamping. Cam face 108 is spaced radially inward from a circular mounting flange 109. That flange is fittingly received in annular recess 102 in the cam carrier, and may be locked against rotation by the notches 112, which receive tongues formed in recess 102. Cam face 108 varies in height from a maximum level above flange 109, at the point of follower engagement as shown in FIGS. 2 and 3, to a point of minimum level below flange 109, at the opposite side of axis 21. That variation of level represents a generally sinusoidal function of angle, as already indicated. That function may be computed to include correction for such factors as spring compression, as may be desired. The head of screw stud 105 is beveled to clear flange 102 at the lowest part of the cam.

The upper end of spring 110 is seated in an annular recess 114 in the base of cam carrier 76. The lower end of the spring is carried on the support 116, which is threaded on shaft 74 near its lower end and is locked against rotation by the spline formation 117. The upper end of shaft 74 extends through a clearance bore in arm bracket 52, as already mentioned, and fixedly carries a manual knob 118. Rotation of knob 118 moves the lower end of spring 110 up or down as may be required to increase or decrease the axial spring force acting on carrier 76 and cam 100. Shaft 74 may be fully released and removed, permitting removal of spring 110 through the aperture 111 in housing 70 without disassembly of pulley 40.

As arm 22 and cam follower 104 swing about anchor axis 21, for example during normal use of the drafting machine, cam engagement is maintained by bodily axial movement of cam carrier 76 along guideway 78 under the influence of spring 110. The torque exerted by cam action on arm 22, and available to balance the action of gravity on that arm, is proportional to the force exerted by spring 110 and to the inclination of cam 100 at the point of follower engagement. That inclination may be visualized as the helix angle of a helix tangent to the cam face at the point of follower contact. It will be understood that substantially equivalent action can be obtained by many modifications of the present illustrative structure for example by mounting an axial cam on mast 53 or its equivalent and mounting a suitable cam follower on carrier 76.

The total axial travel of cam 100 is preferably small compared to the length of spring 110, even when the latter is adjusted for maximum tension. The spring force is then effectively constant for all rotational positions of arm 22, and the torque exerted on the arm varies with angle in a manner determined substantially entirely by the cam form.

With the arrangement described and illustrated, with anchor 20 mounted at the upper edge 32 of the drafting board, cam 100 is so mounted that follower 104 is at the highest point of the cam when arm 22 extends perpendicularly to edge 32. The balancing torque is then zero, and increases with the sine of the angle as the arm is swung either way from that position, the torque direction aiding that movement. For any given angle of inclination of the board, including vertical position, there is a definite degree of spring tension at which effectively perfect balance is obtained for all arm angles. That required tension is readily obtained by manipulation of knob 118.

The present invention further provides conveniently adjustable counterbalancing of the lower arm 24 of the drafting machine in such a way that the described counterbalancing of the upper arm is not disturbed. The elongated member 120 is mounted coaxially of elbow pulley 42 for free axial translational movement, but in fixed rotational relation. As shown, member 120 is of square section and is freely slidable in a fitting square coaxial hole in the pulley. The lower end of member 120 carries an integrally formed radial arm 122 on which is mounted a cam follower 124.

Follower 124 engages the downwardly facing cam face 128 of the axial cam 130. Cam 130 is typically formed of sheet material, as by stamping, and has a circular mounting flange 132 by which it is fixedly mounted by the screws 133 on lower arm bracket 62 coaxially of elbow axis 23. The form of cam face 128 is generally sinusoidal, as already described for cam 100.

Cam engagement is yieldingly urged by the spring 134, shown as a coil spring mounted above pulley 42. The lower end of the spring bears on the upper axial face of the pulley via a thrust washer 135. The upper end of the spring is seated in an annular recess in the knob 136, which is threaded on the upper end of member 120. A sleeve 137 is preferably mounted on upper arm bracket 54 surrounding spring 134, effectively closing the variable space between the bracket and knob. Rotation of knob 136 varies the upward force exerted by spring 134 on member 120, which force acts directly to urge engagement of cam 130 and follower 124.

The parts are typically shown in FIG. 4 with lower arm 24 extending perpendicular to the upper edge 32 of the drafting board, rather than in the oblique position of FIG. 1. Cam 130 is mounted on bracket 62 with its high point aligned with arm 24; and follower 124 lies in a plane through elbow axis 23 that is so related to pulley 42 as to be perpendicular to the upper edge 32 of the board. The torque developed by cam 130 is then zero for the angular position shown, and increases with the sine of the angular deflection of arm 24 from that position in either direction. It is particularly to be noted that the described counterbalancing torque exerted on lower arm 24 is independent of the angular position of upper arm 22.

A particularly useful feature of the present counterbalance structure provides a uniform and selected degree of friction to supplement the direct balancing action. Cam follower 124 comprises a small block of selected material having a flat upper face 125 that engages the cam and a generally hemi-cylindrical lower surface 126. The latter surface is received in a recess 127 of complementary form in arm 122 (FIG. 5).

As the inclination of cam 130 varies with arm rotation, block 124 accommodates to that change by turning in the cup-shaped recess 127. The block thus always presents its face 125 flatly to the cam. The resulting flat sliding action of the block on the cam produces negligible wear, and the friction at the sliding surfaces is remarkedly uniform. Highly satisfactory action is obtained by forming block 124 of nylon and cam 130 of steel. The friction then tends to compensate any slight departure from perfect adjustment of the counter-balance mechanism, without resisting rotation of lower arm 24 sufficiently to be noticeable to the operator. A further advantage of the described device for developing friction is that the frictional force increases with the tension of spring 134. Even at high angles of board inclination the friction is therefore adequate for the intended purpose, yet it is automatically reduced effectively to zero by release of spring 134 when the board is horizontal.

In head assembly 26, main head bearing 47 has its outer race mounted, as by a press fit, in head bracket 64. Its inner race carries head pulley 44, which maintains a fixed reference angle relative to the drawing board, due to control by band 48, as already described. The upper axial face of head pulley 44 carries the protractor and index plates 140 and 144, respectively, fixedly mounted by the screws 145. On the resulting effectively unitary pulley assembly is journaled the spindle assembly 150, typically made up of several fixedly related parts. Those parts comprise the spindle 152; the housing plate 154, fixedly mounted, as by a press fit, on the upper end of spindle 152; the stem plate 156, fixedly mounted, as by a press fit, on the lower end of the spindle; the shield 158, which is fixedly mounted on the lower face of stem plate 156 by the screws 159; and the manual knob 160, mounted on the boss 155 of housing plate 154 by screws 161. Spindle assembly 150 is journaled on pulley 44 by the single spindle bearing 162. It can be removed only by disassembly, as by pressing spindle 152 out of housing plate 154 with the help of a suitable tool.

Spindle assembly 150 may be releasably coupled rotatively to index plate 144 by either of two independently actuable locking means, the friction clamp 164 and the indexing mechanism 170, to be described. The angular position of the spindle assembly when so locked may be read on a suitable scale 141, engraved on the upper face of protractor plate 140 (FIGS. 7 and 10). A reference zero and vernier scale are mounted on housing plate 142 adjacent scale 141 in position to be visible through a window 148 cut in the latter.

A particularly economical and convenient manner of mounting the zero and vernier markings is to engrave or cast them directly in the lower face of a magnifying lens element 146. That element may, for example, be formed of any suitable transparent plastic. A mounting flange 147 is preferably formed integrally with the body of the lens, receiving the screws 149 and effectively sealing window 148. The lower surface of the lens extends below flange 147 and is closely spaced above the protractor scale, thus eliminating parallax. The upper lens surface is preferably cylindrically convex with the cylindrical axis extending radially with respect to head axis 23. With the described arrangement, protractor 140 and its scale 141 are fully enclosed within a chamber 153 which they form with housing plate 154, and are thus protected from dust and accidental damage. At the same time the scale visibility is greatly improved, both by the lens 146 and by its elevated position above head pulley 44 and its associated mechanism. Moreover, that elevated position permits the protractor to be designed with a large enough diameter to insure accurate and convenient reading without obstructing a corresponding area of the drawing.

The friction locking device 164 comprises the clamp screw 165 which may, for example, be mounted freely in a bore in housing plate 154, being retained and prevented from turning by the rim of protractor 140 which enters a cut in the screw shank. A clamp nut with lever handle 166 draws the screw up, causing its large head to clamp the rim of protractor 140 against the under side of housing plate 154. That action releasably clamps spindle assembly 150 in any desired angular position relative to head pulley 44, and hence relative to the drawing board.

When clamp 164 is released, the spindle assembly can be locked in a selected one of several spaced angular positions by the indexing mechanism 170. The periphery of index plate 144 is indented at uniform angular intervals, typically every 15°, as shown at 174 in FIG. 7. A locking lever 176 is pivoted at 177 on a screw stud set in the under side of housing plate 154. The locking lever overlies index plate 144, but carries a downwardly extending finger 178 adapted to enter an indentation 174 of index plate 144 in response to clockwise rotation of the lever, as seen in FIG. 7. Such rotation is yieldingly urged by a spring 179, so that finger 178 normally enters an indentation automatically whenever the latter comes into alignment with it. The finger wedges between the inclined walls of the indentation, locking the spindle assembly in a positively defined position.

The indexing mechanism may be released by manually depressing the plunger 180. That plunger is slidable in a guideway formed typically by a transverse bore 181 in the sleeve portion of knob 160. The boss 155 of housing plate 154 is cut away at 182 to clear the plunger. The torque ring 184 is mounted for free rotation coaxially of head axis 23 between housing plate 154 and index plate 144. An arm 185 (FIG. 10) extends upwardly from torque ring 184 through a clearance aperture 186 in the housing plate. That arm carries a yoke formation 187 which engages a circumferential groove 183 in plunger 180. Axial movement of the plunger is thereby coupled with rotary movement of torque ring. That movement is transmitted to lock lever 176 by means of the link 188 which is pivoted on the lock lever at 189 and on a radial arm 190 of torque ring 184.

A detent pin 192 is fixed in the lower part of knob 160 and is received in an L-shaped slot 193 in the lower cylindrical surface of plunger 180. The axial branch of the slot normally permits free plunger movement. When the plunger is depressed to release indexing mechanism 170, clockwise rotation of the plunger causes pin 192 to enter the transverse branch of slot 193, as shown in FIG. 7. The indexing mechanism is thereby locked in released position. The operator can then freely rotate spindle assembly 150 by means of knob 160, or can clamp it in any desired intermediate position by friction clamp 164.

Figure 9:
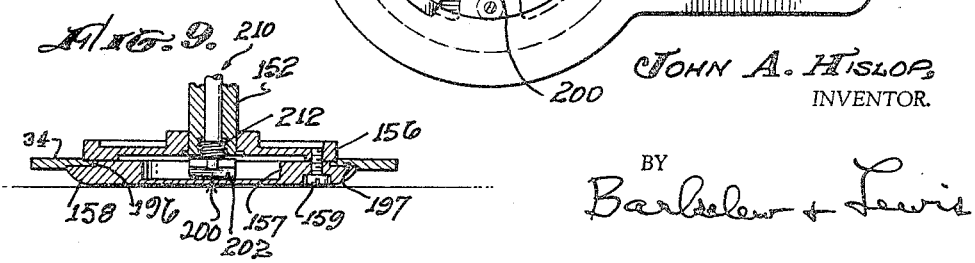
FIG. 9 is a fragmentary section on line 9—9 of FIG. 6.

Scale carrier 34 is rotatably mounted on the lower end of spindle assembly 150 in a manner that permits alternatively free rotational adjustment about head axis 25, commonly referred to as the base line adjustment; or convenient releasable clamping in any desired angular position. In the present illustrative embodiment of the invention, scale carrier 34 comprises a flat plate having a large circular hole 196. The rim of that hole is received in a peripheral groove 197 formed between stem plate 156 and shield 158, which groove forms a plain bearing for rotation of the scale carrier about axis 25. The axial dimension of that groove is positively defined by direct contact of the shield and stem plate at the shield pads 157 adjacent screws 159 (FIG. 9). One or more support buttons 198 may be mounted on the lower surface of scale carrier 34 to support it and shield 158 in spaced relation to the working surface 31; or a single support may be mounted on shield 158 on head axis 25.

Clamping mechanism for the scale carrier is indicated generally at 200, and comprises the two brake levers 202, the drive stem 210, and control lever 216. Brake levers 202 are movably mounted in generally radial position within a chamber formed between stem plate 156 and shield 158 by recesses in their opposing faces. The radially outer ends of the levers engage the lower face of scale carrier 34 at 204 close to the aperture 196. The levers are fulcrumed on a slight shoulder 206 formed in the bottom of the recess in shield 158. That fulcrum point is preferably spaced from the working end of the lever by a small fraction of the lever length. As illustrated, that fraction is approximately one fifth, but values in the range from about one third to about one tenth are also effective.

Drive stem 210 is rotatably mounted in a coaxial bore in spindle 152, in which it is threaded at 212 only adjacent its lower end. The space required for the threads 212 then does not weaken the main portion of the spindle. Below threads 212, stem 210 is reduced in diameter, forming a downwardly facing axial shoulder 214 and a defining tip 215. Shoulder 214 engages the upper faces of levers 202 at their radially inner ends, which are notched at 207 to receive stem tip 215.

Rotation of stem 210 is controlled by the manual handle 216, which is fixedly mounted as by a press fit on the knurled upper end of the stem within the sleeve portion of knob 160, already described. A clearance slot 217 in the knob sleeve permits the limited range of angular movement required for handle 216. Such rotation in one direction moves stem 210 downward by action of threads 212. The inner ends of levers 202 are thereby depressed, raising their outer ends relative to fulcrums 206 into pressure engagement with the scale carrier at 204. The latter is thereby pressed upward against the opposing face of stem plate 156, the resulting friction effectively locking the carrier rotation to spindle assembly 150. Opposite rotation of handle 216 releases substantially all of that friction, permitting the operator to turn scale carrier 34 on the working surface or to turn spindle assembly 150 relative to the carrier. Such rotation of the relative rotation of the spindle assembly and scale carrier is convenient for aligning the scales with a particular drawing, for example, without changing the reading at protractor scale 141. On the other hand, when clamping mechanism 200 is engaged, the scale carrier can be rotated by knob 160 to a desired angle relative to the drawing, which angle is read on protractor scale 141.

The described head structure has the particular advantage that braking pressure is applied at points 204 with a large mechanical advantage derived both from screw threads 212 and from the described position of fulcrum 206. Moreover, it is particularly convenient that indexing mechanism release plunger 180 and base line release control lever 216 are both located close to the plane of knob 160, and that they normally turn with that knob as the scale carrier is rotated on the work surface. That arrangement facilitates operation of all three of those controls with the left hand, leaving the right hand free.

The described counterbalancing mechanisms at the anchor assembly and at the elbow have the great advantage that they are adjustable by easily accessible knobs 118 and 136 of large diameter that are mounted directly on the respective pivot axes with which they are associated.

The head structure further provides an elevated position of protractor scale 141, permitting relatively large scale radius without obstructing a corresponding area of the work surface. The fully enclosed protractor scale excludes dirt and possible damage, maintaining the high accuracy made possible by optical magnification of the scale and vernier markings.

I claim:

1. Counterbalance mechanism for a drafting machine that comprises two support members mutually rotatable about a pivot axis, said counterbalance mechanism comprising in combination an axial cam having a generally annular cam face and mounted in fixed rotational relation to one of said members coaxially of the pivot axis, cam follower means mounted in fixed rotational relation to the other member in position to engage the cam face, the cam and cam follower means being axially movable relative to each other, and spring means yieldingly urging said relative axial movement of the cam and cam follower means in a direction to cause cam engagement, said axial cam comprising a unitary formation having a radially outer circular flange portion and a radially inner cam portion that includes an axially facing cam face of generally sinusoidal form, the cam face lying partly on one side of the plane of the flange and partly on the other side thereof.

2. Counterbalance mechanism for a drafting machine that comprises two support members mutually rotatable about a pivot axis, said counterbalance mechanism comprising in combination guide means mounted on one of the members and extending parallel to the pivot axis, a support movable along the guide means and rotationally fixed with relation to said one member, an axial cam element and a cam follower element, said elements being mounted in mutual engagement one on the support and the other on the other said member, spring means yieldingly urging the support axially along the guide means in a direction to cause cam engagement, a manually operable control element mounted for rotation about the pivot axis, and means coaxially threaded with respect to the control element for adjustably varying the tension of the spring means in response to rotation of the control element.

3. Counterbalance mechanism for a drafting machine that comprises an anchor assembly adapted to be fixedly mounted relative to a work surface, and an arm assembly pivotally mounted on the anchor assembly for mutual rotation about a pivot axis perpendicular to the work surface; said counterbalance mechanism comprising in combination an axial cam having a generally annular cam face, means mounting the cam coaxially of the pivot axis for translational movement parallel to that axis and in fixed rotational relation to one of said assemblies, cam follower means mounted in fixed rotational relation to the other said assembly in position to engage the cam face, a coil spring mounted coaxially of the pivot axis with one end longitudinally coupled to the cam mounting means, a spindle rotatably mounted coaxially of the pivot axis and having one end accessible above the work surface for manual operation, and support means for the other end of the spring in screw-threaded relation to the spindle adjacent its other end.

4. Counterbalance mechanism for a drafting machine that comprises an anchor assembly adapted to be fixedly mounted relative to a work surface and an arm assembly pivotally mounted on the anchor assembly for mutual rotation about a pivot axis perpendicular to the work surface; said counterbalance mechanism comprising in combination a cam support mounted on the anchor assembly for translational movement parallel to the pivot axis, an axial cam carried by the cam support coaxially of the pivot axis in fixed rotational relation to the anchor assembly, cam follower means carried by the arm assembly in fixed rotational relation thereto in position to engage the cam, a spindle rotatably mounted coaxially of the pivot axis and having one end accessible above the arm assembly and the other end extending below the cam support, handle means carried by the upper end of the spindle, and spring means acting between the lower end of the spindle and the cam support, said spring means yieldingly urging the cam support axially in a direction to cause cam engagement.

5. In a drafting machine, the combination of anchor housing structure defining a pivot axis and forming a generally coaxial chamber, means for mounting the housing structure on a drawing board or the like with the axis perpendicular to the work surface thereof, centrally apertured pulley means fixedly mounted on the housing structure on said axis adjacent the upper end of the chamber, support means mounted in the chamber for axial translational movement, a pivot stem journaled in the aperture of the pulley means, an arm assembly mounted on the pivot stem above the pulley means, an axial cam member and a cam follower member mounted in the chamber in mutually engaging relation, one of said members being mounted on the support means and the other on the pivot stem below the pulley means, coaxial spring means mounted in the chamber with its upper end engaging the support means, a spindle rotatably mounted on the pivot axis, means threadedly engaging the spindle and supporting the lower end of the spring means, and means for manually operating the last said means to vary the spring pressure exerted upon the support means.

6. The combination defined in claim 5, and wherein the spindle is journaled with respect to the support means in axially movable relation thereto, and including a bearing for the pivot stem acting between the lower end of the pivot stem and the spindle.

7. The combination defined in claim 6 and wherein the spindle extends upwardly through a coaxial clearance aperture in the pivot stem, and the last said means comprises handle means operatively engaging the upper end of the spindle above the arm assembly.

8. In combination with a drafting machine that comprises an anchor assembly adapted to be fixedly mounted relative to a work surface, an upper arm pivotally mounted at one end on the anchor assembly, a lower arm pivotally mounted on the other end of the upper arm on a pivot axis, a reference element journaled on the pivot axis, and means maintaining fixed rotational relation between the reference element and the anchor assembly; counterbalance mechanism for said lower arm comprising an axial cam member mounted in fixed rotational relation to the lower arm coaxially of the pivot axis and having a downwardly facing generally annular cam face, control means axially movable relative to the reference element, cam follower means mounted on said control means below the reference element in fixed rotational relation thereto and engaging the cam face, spring means urging upward movement of the control means relative to the reference element, and manually actuable means above the reference element for adjusting the tension of the spring means.

9. In combination with a drafting machine that comprises an anchor assembly adapted to be fixedly mounted relative to a work surface, an upper arm pivotally mounted at one end on the anchor assembly, a lower arm pivotally mounted on the other end of the upper arm on a pivot axis, a reference element journaled on the pivot axis, and means maintaining fixed rotational relation between the reference element and the anchor assembly; counterbalance mechanism for said lower arm comprising an axial cam member mounted in fixed rotational relation to the lower arm coaxially of the pivot axis and having a downwardly facing generally annular cam face, an elongated control member mounted in fixed rotational relation to the reference element and axially movable relative thereto, cam follower means mounted on the control member below the reference element and engaging the cam face, handle means threaded on the control member above the reference elements, and spring means acting between the handle means and the reference element to urge the cam follower means into engagement with the cam face.

10. Counterbalance mechanism as defined in claim 9, and wherein said cam follower means comprise a cam follower element having a substantially flat face adapted to engage the face of the cam, and structure mounting the cam follower element on the control member for limited rotational movement about an axis that is essentially radial with respect to the cam axis.

11. Counterbalance mechanism for a drafting machine that comprises an anchor assembly adapted to be fixedly mounted relative to a work surface and an arm assembly pivotally mounted on the anchor assembly for mutual rotation about a pivot axis perpendicular to the work surface, the arm assembly including a radially extending arm adapted to carry a drafting instrument; said counterbalance mechanism comprising in combination a cam support mounted on the anchor assembly for translational movement parallel to the pivot axis, an axial cam carried by the cam support coaxially of the pivot axis in fixed rotational relation to the anchor assembly, cam follower means carried by the arm assembly in fixed rotational relation thereto substantially in a common axial plane with the arm and in position to engage the cam, a spindle rotatably mounted coaxially of the pivot axis and having one end accessible above the arm assembly and the other end extending below the cam support, handle means carried by the upper end of the spindle; and spring means acting between the lower end of the spindle and the cam support, said spring means yieldingly urging the cam support axially in a direction to cause cam engagement, said cam engagement tending to rotationally counterbalance the arm assembly and also to swing the arm away from the work surface in said common axial plane.

References Cited by the Examiner

UNITED STATES PATENTS

| | | | |
|---|---|---|---|
| 2,362,050 | 11/44 | Cole et al. | 33—79.4 |
| 2,487,345 | 11/49 | Liber | 33—79 |
| 2,552,335 | 5/51 | Little et al. | 33—79.4 |
| 2,900,728 | 8/59 | Wallace | 33—79 |

ISAAC LISANN, *Primary Examiner.*